Figure 1:
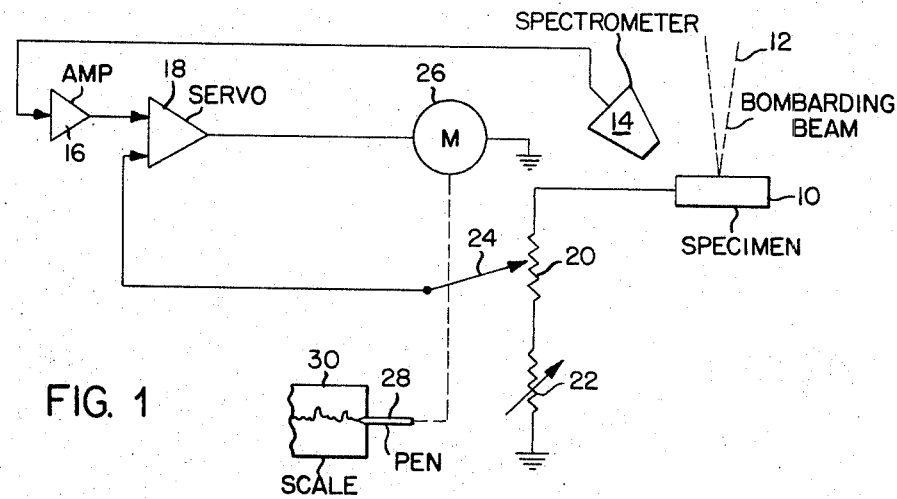

INVENTOR
MAURICE F. HASLER
ATTORNEY

United States Patent Office 3,351,755
Patented Nov. 7, 1967

---

3,351,755
**METHOD OF AND APPARATUS FOR SPECTRO-
SCOPIC ANALYSIS HAVING COMPENSATING
MEANS FOR UNCONTROLLABLE VARIABLES**
Maurice F. Hasler, Montecito, Santa Barbara, Calif., assignor to Applied Research Laboratories, Inc., Glendale, Calif., a corporation of Delaware
Filed Sept. 25, 1964, Ser. No. 399,163
11 Claims. (Cl. 250—49.5)

This invention relates to novel methods of and apparatus for chemical analysis by spectroscopic means, and, more particularly, to novel electrical basis ratio techniques for automatically and continuously compensating for uncontrollable variables in the analysis.

In spectroscopic instruments of the type wherein a particulate beam or a beam of radiation is directed upon a material to develop a signal indicative of the composition of the material, uncontrollable variables are often encountered, which, if not compensated for, produce inaccuracies in measurement. It has heretofore been the usual practice to compensate for such variables to the extent it was possible to do so by precise regulation of all variable factors that may affect the beam, or by computation, making use of experimental data previously gathered and accordingly adjusting the values indicated by the spectrometer to arrive at a value thought to be more truly indicative of the concentration of the selected analyte in the material under analysis. In the usual method, the spectrometer was arranged to produce electrical signals in response to characteristic X-rays emitted by a material, and the magnitude of the signals so produced, on either an instantaneous or a time integral basis was taken as the initial indication of the concentration of the analyte. Integrating the signals tends to reduce the effect of transient, unpredictable variations, but does not eliminate the need of compensating by computation for known, predictable variables. Integration also increases the time required for an analysis, and is, therefore, undesirable for use in applications where high speed is desired.

One method of compensating automatically for many of the variables encountered in X-ray spectroscopy was taught by Andermann and Kemp in Patent No. 2,897,367. In that method two spectrometers were used simultaneously, one being arranged to detect X-rays characteristic of a selected element called an analyte. The second spectrometer was arranged to detect X-rays at a wavelength where there was no, or only insignificant X-ray radiation characteristic of any element present in the material, i.e., to detect background, or scattered radiation. The outputs of the two spectrometers were compared to produce a resulting ratio signal, which was a more accurate indication of the concentration of the analyte in the specimen than was the signal produced by the first spectrometer alone.

The Andermann/Kemp method represented a significant step forward in the art, and enabled the practical utilization of X-ray analytic methods in on-line process control systems. However, it requires the use of two, instead of only one spectrometer, and is not conveniently adaptable for use in scanning type systems which are arranged to scan a spectrum and measure the concentrations of a large number of elements in rapid sequence.

Accordingly, one important object of the present invention to to improve the art of chemical analysis by spectroscopic means, particularly by the use of a novel ratio method.

Other objects are: to provide a novel method of measuring the concentration of a selected analyte in a material by means of its characteristic response to X-ray radiation, or to bombardment by a particulate beam such as an electron beam or an ion beam; to provide a novel method of and apparatus for producing an electrical signal responsively to the output of a spectrometer whereby the effects of uncontrollable variables are minimized; and to provide a novel method of and apparatus for this purpose which are simple and inexpensive, yet highly reliable and effective.

Three illustrative embodiments of the invention will now be described in detail in connection with the drawing, wherein:

FIGURE 1 is a schematic diagram illustrating the practice of one embodiment of the invention wherein the comparison signal is produced in response to current passing through the material being bombarded.

Figure 2:
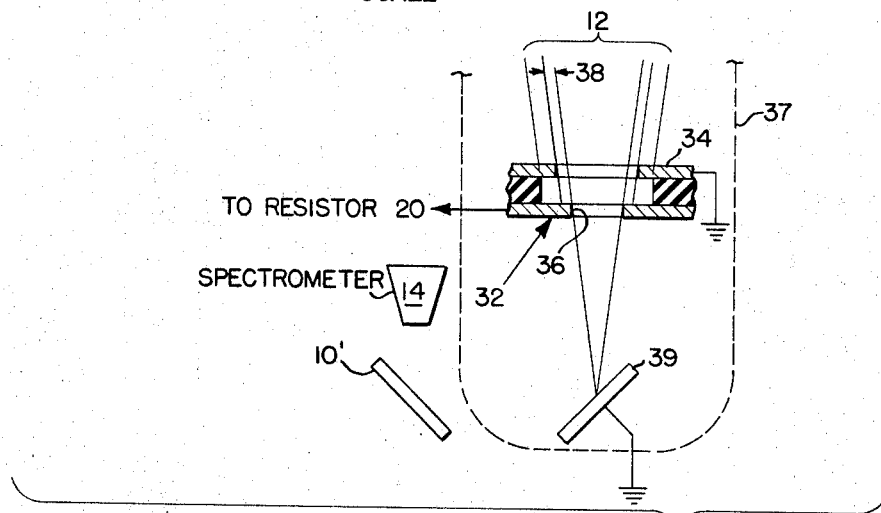
Figure 3:
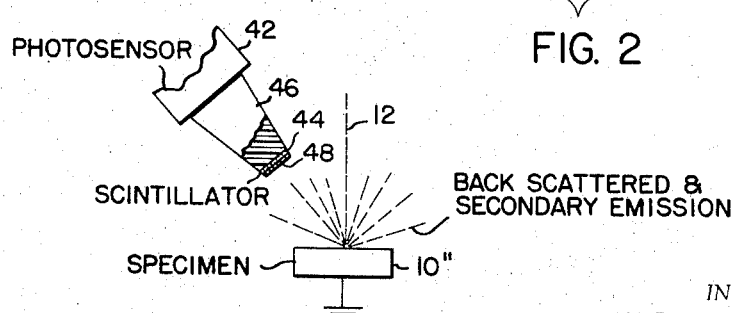

FIGURE 2 is a fragmentary, schematic diagram illustrating the practice of another embodiment of the invention, wherein the comparison signal is produced in response to a selected portion of the bombarding beam of an X-ray tube used in fluorescence work; and FIGURE 3 is a schematic diagram illustrating the practice of a third embodiment of the invention wherein the basis of comparison is a signal produced responsively to back scattered and secondary emission from a bombarded specimen.

Briefly, according to the present invention, it has now been found that a high degree of compensation for undesired and uncontrollable variables in spectroscopy may be achieved by comparing the output signal of the spectrometer with a signal indicative of the magnitude of the particulate beam used to bombard the material under analysis or to generate X-rays for irradiating it.

In emission spectroscopy, the beam is directed at the material under analysis; in fluorescence spectroscopy, the beam is directed at the target of an X-ray tube, which then irradiates the material being analyzed. In either case, the comparison signal, that is, the signal with which the output of the spectrometer is compared, may be generated as desired so long as it is representative of the instantaneous value of the current in the beam at its point of impact. The comparison signal may, for example, be produced responsively to current through the material or target being bombarded. It may be produced by intercepting a portion of the bombarding beam, or it may be produced responsively to the back scattered and secondary electron or ion emission of the material or target.

It is believed that in the current state of the art the invention will find its maximum utilization in emission spectroscopy, wherein a material under analysis is bombarded by an electron beam. It will, however, also be of advantage in fluorescence work, and in analytical systems wherein signals are generated in response to bombardment by a beam of other particles such as an ion beam, the flow of which is susceptible of measurement.

Referring now to the drawing, according to a first embodiment of the invention illustrated in FIG. 1, a specimen 10 of a material to be analyzed is bombarded by an electron beam 12, and emits X-rays (not shown) which are detected by a spectrometer 14 or any other desired type of X-ray detector. The spectrometer 14 produces an electrical signal, which is fed to an amplifier 16, the output of which is fed into one input of a servo amplifier 18.

The specimen 10 is mounted on an insulating support (not shown) and grounded through a pair of resistors 20 and 22 connected in series between the specimen 10 and ground. The voltage across the two resistors 20 and 22 is proportional to the instantaneous value of the current through the specimen material 10, and thus proportional to the instantaneous value of the beam current 12 at its point of impact. A slide arm 24 is arranged on the first resistor 20 for feeding a fraction of the voltage across the two resistors 20 and 22 to the second input of the servo amplifier 18. The servo amplifier 18 senses any difference between the voltages at its respective inputs relative to ground, and drives the motor 26 in a direction to minimize any such difference.

The motor 26 is connected to drive both the slide 24 along the resistor 20 and the recording pen 28 of a strip chart recorder 30, or any other desired indicating device. In operation, within the limits of response of the servo amplifier 18 and the motor 26, the position of the pen 28 represents the ratio between the output of the detector 14 and the instantaneous value of the current through the specimen 10.

It has been found that this ratio provides a relatively precise and accurate indication of the concentration of an analyte in the specimen 10 and is substantially unaffected by many of the uncontrollable variables encountered in X-ray spectroscopy such as, for example, drift in cathode emission and changes in the biasing voltages in the cathode ray gun, changes in the accelerating voltage and in the focusing system for the beam, and all other factors that effect changes in the total current of the beam.

The resistor 22, in series with the resistor 20, is variable, and is in the circuit in order to enable adjustment of the position of the zero level relative to the strip chart recorder 30. When the variable resistor 22 is short circuited, the ordinate of the strip chart recorder, that is, the full travel of the recording pen 28, represents the full range of ratios available from zero to 100%. As the value of the variable resistor 22 is increased, the travel of the pen 28 represents a smaller and smaller proportion of the full range, always at the upper part of the scale. For example, if the value of the variable resistor 22 is made equal to the value of the fixed resistor 20, the full travel of the pen represents a range of 50% up to 100%.

In the system as shown, arranged for emission spectroscopy, the recorder 30 traces the instantaneous values of the ratio between the signal produced by the X-ray spectrometer 14 and the electrical current through the specimen 10. In fluorescence work, wherein the specimen 10 is not bombarded by the electron beam, but is, instead illuminated by X-ray radiation from an X-ray tube, the comparison signal according to this embodiment of the invention is produced responsively to the current thorugh the target of the X-ray tube (not shown in FIGURE 1).

In cases where the bombarding beam 12 is composed of ions instead of electrons, the specimen 10 emits ions, normally of the same charge polarity as the bombarding ions, and the spectrometer 14 is a mass spectrometer for analyzing the emitted ions. The principles of the invention remain the same.

The second embodiment of the invention is illustrated in FIGURE 2 as arranged for fluorescence work. A selected portion 38 of the electron beam 12 in the X-ray tube 37 is intercepted by a conductive ring 32 to produce the comparison signal indicative of the flux of the beam 12 at its point of impact on the target 39. X-ray radiation from the target 39 emerges from the tube 37, and illuminates the specimen 10′ under examination. The specimen 10′ fluoresces, and the fluorescent X-rays are detected by the spectrometer 14.

The electron beam 12 passes first through a grounded diaphragm aperture 34, which limits the beam, and absorbs radially outer portions of it. It then passes through the central aperture 36 of the ring, which is coaxial with the beam and insulated from other structure in the X-ray tube. Conveniently, the ring 32 may be supported from the aperture diaphragm 34, as shown. The ring 32 is grounded through the resistors 20 and 22 (FIGURE 1) and the portion of the beam 12 intercepted by the ring 32 produces a voltage across the resistors 20 and 22, which voltage constitutes the comparison signal.

Preferably, according to this embodiment of the invention, the intercepted portion of the bombarding beam 12 is a portion close to the axis of the beam so that it will vary in similar manner as the axial portion, which passes on to the target.

For emission work according to this second embodiment of the invention, the beam 12 is directed upon the material being analyzed, which takes the place of the target 39 in the X-ray tube. The principle, however, remains the same.

The collector ring 32 may be positioned in any convenient location in the apparatus along the path of the electron beam 12. In apparatus where magnetic focusing means are used to focus the electron beam upon the target of the X-ray tube or upon the specimen, the collector ring 32 may be conveniently placed immediately adjacent to the magnetic gap of the objective electron lens and supported by attachment to the lens housing. This provides a very simple and inexpensive arrangement.

According to a third embodiment of the invention, as illustrated in FIG. 3, the electrical signal produced by the spectrometer (not shown) 14 is compared with a comparison signal produced in response to the back scattered particles and secondary emission from the specimen 10″. This signal may be produced, as illustrated, by a photomultiplier tube 42, or any other photodetector of adequate sensitivity, which is arranged to receive light produced by a scintillator material in response to the scattered and secondarily emitted particles.

The scintillator material 44 is one selected to be insensitive to X-ray rediation, and sensitive only to the back scattered electrons or ions and the particulate secondary emission from the specimen 10″. For example, if the secondary emission consists primarily of electrons, the scintillator material may consist of organic fluors in a matrix of polyvinyltoluene, which is a known, commercially available material. The scintillator material 44 is fixed on the front face of a transparent support, or light pipe 46 and positioned close to the specimen 10″, but offset from the beam 12. Light generated by the scintillator material 44 is transmitted through the light pipe 46 to the photomultiplier 42.

The material 44 and the light pipe 46 are protected from ambient illumination by an optically opaque coating 48 applied over the scintillator material 44. A thin film of aluminum has been found to be satisfactory for this purpose, excluding ambient light while permitting passage of the secondary particles.

The output of the photomultiplier is fed, either directly or through an amplifier (not shown) to the resistor 20 (FIGURE 1) to produce the comparison signal. The back scattered and secondary electron or ion emission from the specimen 10″ are directly related to the intensity of the bombarded beam, so that by this method also, the comparison signal is proportional to the flux of the bombarding beam at its point of impact.

One important advantage in the practice of the invention is its general and fundamental nature. The same comparison signal serves as the basis for comparing all signals produced by the spectrometer regardless of the wavelengths of the radiation being measured. Another advantage is its relative simplicity, and the ease with which the comparison signal may be produced.

The choice of one particular way of producing the comparison signal will depend to a large extent upon the nature of the material being bombarded, its conductivity or insulating properties, and its uniformity of internal structure, as well as by factors of convenience and cost.

What is claimed is:

1. Method of spectroscopic chemical analysis comprising the steps of:
    (1) bombarding a material to be analyzed with a particulate beam to cause the material to emit radiation characteristic of a selected analyte in it,
    (2) producing a first continuous signal indicative of the intensity of the characteristic emission so emitted,
    (3) producing a second continuous signal indicative of the flux in the beam at its point of impact on the material, and
    (4) comparing said signals with each other to produce a continuous output signal which is primarily a function of the concentration of the selected analyte and highly independent of other variables.

2. Method of spectroscopic chemical analysis comprising the steps of:
   (1) bombarding a target with a particulate beam to produce X-ray radiation,
   (2) directing X-ray radiation so produced upon a material to be analyzed to cause the material to emit radiation characteristic of a selected analyte in it,
   (3) producing a first continuous signal indicative of the intensity of the characteristic radiation so emitted,
   (4) producing a second continuous signal indicative of the flux in the particulate beam that bombards the target at its point of impact on the target, and
   (5) comparing said signals with each other to produce a continuous output signal which is primarily a function of the concentration of the selected element in the material under analysis and highly independent of other variables.

3. Spectroscopic analytical apparatus comprising:
   (1) means for producing a particulate beam, and generating characteristic emission from a material to be analyzed responsively to said beam,
   (2) means for producing a first continuous signal indicative of the intensity of the characteristic emission so generated,
   (3) means for producing a second continuous signal indicative of the flux in said beam, and
   (4) means for comparing said first and second signals to produce a continuous output signal which is more truly indicative of the concentration of a selected analyte in the material than said first signal.

4. Spectroscopic analytical apparatus comprising:
   (1) means for producing a particulate beam and directing it toward a material under analysis to generate emission from the material characteristic of a selected analyte in it,
   (2) means for producing a first continuous signal indicative of the intensity of the characteristic emission so generated,
   (3) means for producing a second signal indicative of the flux in said beam, and
   (4) means for comparing said first and second signals to produce a continuous output signal which is more truly indicative of the concentration of a selected analyte in the material than said first signal.

5. X-ray analytical apparatus comprising:
   (1) means for producing a particulate beam and directing it toward a target to cause the target to emit X-ray radiation,
   (2) means for directing X-ray radiation so produced toward a material to be analyzed to cause the material to fluoresce,
   (3) means for producing a first continuous signal indicative of the intensity of the fluorescent X-rays emitted by the material,
   (4) means for producing a second continuous signal indicative of the flux in said beam, and
   (5) means for comparing said first and second signals to produce a continuous output signal which is more truly indicative of the concentration of a selected analyte in the material than said first signal.

6. X-ray analytical apparatus comprising:
   (1) means for producing an electron beam, and causing a material to be analyzed to emit X-ray radiation responsively to said beam,
   (2) means for producing a first continuous signal indicative of the intensity of X-rays so emitted by the material,
   (3) means for producing a second continuous signal indicative of the flux in said beam, and
   (4) means for comparing said first and second signals to produce a continuous output signal which is more truly indicative of the concentration of a selected analyte in the material than said first signal.

7. Spectroscopic analytical apparatus comprising:
   (1) means for producing a particulate beam and causing it to impinge upon a selected object, and generating characteristic emission from a material to be analyzed responsively to said beam,
   (2) means for producing a first continuous signal indicative of the intensity of the generated characteristic emission from the material,
   (3) means for producing a second continuous signal indicative of the flux of the particles of said beam flowing through the object upon which said beam impinges, and
   (4) means for comparing said first and second signals to produce a continuous output signal which is more truly indicative of the concentration of a selected analyte in the material than said first signal.

8. Spectroscopic analytical apparatus comprising:
   (1) means for producing a particulate beam, and generating characteristic emission from a material to be analyzed responsively to said beam,
   (2) means for producing a first continuous signal indicative of the intensity of the generated characteristic emission from the material,
   (3) means for intercepting a selected portion of said beam and producing a second continuous signal indicative of the flux in said selected portion, and
   (4) means for comparing said first and second signals to produce a continuous output signal which is more truly indicative of the concentration of a selected analyte in the material than said first signal.

9. X-ray analytical apparatus comprising:
   (1) means for producing a particulate beam and directing it to impinge upon a material to be analyzed to cause the material to emit radiation characteristic of a selected analyte in it,
   (2) means for producing a first signal indicative of the intensity of radiation so emitted by the material,
   (3) means for producing a second signal indicative of the value of the secondary particulate emission caused by impingement of the beam upon the material, and
   (4) means for comparing said first and second signals to produce an output signal indicative of the ratio between the values of said first and second signals, said output signal being more truly indicative of the concentration of the selected analyte than said first signal.

10. X-ray analytical apparatus comprising:
    (1) means for producing a particulate beam and directing it to impinge upon a target to produce X-ray radiation,
    (2) means for directing X-ray radiation so produced from said target to a material to be analyzed to cause the material to emit radiation characteristic of a selected analyte in it,
    (3) means for producing a first signal indicative of the intensity of the characteristic radiation so emitted by the material under analysis,
    (4) means for producing a second signal indicative of the value of the secondary particulate emission from the target responsive to said particulate beam, and
    (5) means for comparing said first and second signals to produce an output signal indicative of the ratio between the values of said first and second signals, said output signal being more truly indicative of the concentrtion of the selected analyte in the material than said first signal.

11. X-ray analytical apparatus comprising:
    (1) means for producing a particulate beam, and causing a material to be analyzed to emit X-ray radiation responsively to said beam,
    (2) means for producing a first signal indicative of the intensity of X-rays so emitted by the material, (3) means for producing a second signal indicative of the flux in said beam, and (4) means for comparing said first and second signals with each other and producing an output signal indicative of the ratio between the values of said first and second signals, said output signal being more truly representative of the concentration of a selected analyte in the material than said first signal.

References Cited

UNITED STATES PATENTS

| 3,193,679 | 7/1965 | Melford et al. | 250—49.5 |
| 3,204,095 | 8/1965 | Watanabe | 250—49.5 |

FOREIGN PATENTS 156,251   8/1962   Russia.

OTHER REFERENCES

"Beam Stabiilty In the Electron Probe Micro Analyzer," by Fitzgerald, from the Proceedings of the Twelfth Annual Conference on Applications of X-ray Analysis held August 7 to 9, 1963; Advances In X-ray Analysis; edited by Muller et al.; pages 378–379.

RALPH G. NILSON, *Primary Examiner.*

A. L. BIRCH, *Assistant Examiner.*